US005785137A

United States Patent [19]
Reuyl

[11] Patent Number: 5,785,137
[45] Date of Patent: Jul. 28, 1998

[54] HYBRID ELECTRIC VEHICLE CATALYST CONTROL

[75] Inventor: John S. Reuyl, Palo Alto, Calif.

[73] Assignee: Nevcor, Inc., Palo Alto, Calif.

[21] Appl. No.: 642,519

[22] Filed: May 3, 1996

[51] Int. Cl.[6] ........................................... B60K 1/00
[52] U.S. Cl. ............................................. 180/65.2; 60/723
[58] Field of Search .............................. 180/65.2, 65.3, 180/65.4, 65.8, 69.3, 165; 60/723

[56] References Cited

U.S. PATENT DOCUMENTS

| 3,122,696 | 2/1964 | Graybeal et al. | 322/20 |
| 3,515,968 | 6/1970 | Crawford | 318/139 |
| 3,565,202 | 2/1971 | Evans et al. | 180/65 |
| 3,566,717 | 3/1971 | Berman et al. | 74/859 |
| 3,719,881 | 3/1973 | Shibata et al. | 320/62 |
| 3,792,327 | 2/1974 | Waldorf | 318/139 |
| 3,994,354 | 11/1976 | Haumaier | 180/65 |
| 4,021,677 | 5/1977 | Rosen | 290/40 R |
| 4,155,019 | 5/1979 | Weghaupt | 310/61 |
| 4,182,960 | 1/1980 | Reuyl | 290/1 R |
| 4,187,436 | 2/1980 | Etienne | 290/27 |
| 4,199,037 | 4/1980 | White | 180/65 |
| 4,407,132 | 10/1983 | Kawakatsu et al. | 60/716 |
| 4,923,025 | 5/1990 | Ellers | 180/65.2 |
| 5,067,932 | 11/1991 | Edwards | 475/5 |
| 5,346,031 | 9/1994 | Gardner | 180/179 |
| 5,441,122 | 8/1995 | Yoshida | 180/65.2 |
| 5,614,809 | 3/1997 | Kiuchi | 180/65.2 |

OTHER PUBLICATIONS

Wouk, Victor, "Hybrids: Then and Now", IEEE Spectrum, vol. 32, No. 7, Jul. 1995, pp. 16–21.
Bates, Bradford, "Getting a Ford HEV on the Road", IEEE Spectrum, vol. 32, No. 7, Jul. 1995, pp. 22–25.
King, Robert D., et al., "Hybrid Electric Transit Bus", IEEE Spectrum, vol. 32, No. 7, Jul. 1995, pp. 26–31.

Primary Examiner—Robert J. Oberleitner
Assistant Examiner—C. T. Bartz
Attorney, Agent, or Firm—Flehr Hohbach Test Albritton & Herbert LLP

[57] ABSTRACT

A hybrid electric drive system is provided having a heat engine, a catalytic converter, and an electric storage device having a state of charge. The drive system also includes a state of charge sensor and a device for heating the catalytic converter in response to the state of charge of the electric storage device being less than a predetermined state of charge.

8 Claims, 2 Drawing Sheets

HYBRID ELECTRIC VEHICLE CATALYST CONTROL

BACKGROUND OF THE INVENTION

This invention relates generally to hybrid electric vehicles having both a set of electrical energy storage devices and a heat engine. It more particularly relates to a method and apparatus for reducing the undesired constituents produced by the heat engine in the vehicle exhaust.

Most of today's motor vehicles carry an internal combustion (heat) engine that functions optimally at high speeds only. It is by necessity larger than required for most "in town" vehicle operation. Penalties are therefore paid for the luxury of broad range operation—one of which is the dumping of significant exhaust with its undesirable constituents into the atmosphere and consequent deterioration of our environment.

Much effort is being expended at the moment addressing the basic need for an appropriate motor vehicle power source. One approach actively being considered is known as the hybrid approach. In such approach, a vehicle is provided both with a heat engine and a set of electrical energy storage devices, e.g., a battery pack. Such a vehicle typically will also include an electric motor connected to provide at least a portion of the torque needed to drive the vehicle. Generally speaking, there are two types of hybrid electric vehicles. One of these types is referred to as a "series" hybrid electric vehicle and in such type the heat engine is not connected to directly provide driving torque to the vehicle. Rather it is used as a generator. (The term "generator" is used herein in its broadest sense and includes any means, such as an alternator, for converting mechanical energy to electrical energy.) An example of a series hybrid electric vehicle is set forth in U.S. Pat. No. 4,187,436, issued Feb. 5, 1980 to Etienne.

There is besides the series type hybrid electric vehicle discussed above, a parallel type. In a parallel hybrid electric vehicle, the heat engine provides besides mechanical energy to be converted to electrical energy, torque for driving the vehicle. The power output of both the heat engine and the hybrid electric vehicle are added together when necessary to provide driving torque. As a general rule, though, most parallel arrangements are such that there is battery only operation. An example of a parallel hybrid electric vehicle is the vehicle described in Kawakatsu et al U.S. Pat. No. 4,407,132.

The heat engine included in a hybrid electric vehicle is much smaller than the heat engine generally used when no electrically powered motor for driving the vehicle is included. The inclusion of a battery pack or other set of electrical energy storage devices either delays the time at which the heat engine must operate or reduces the amount of driving torque that it must provide. Thus, a hybrid electric vehicle in general runs much "cleaner" than a vehicle which only has a standard industrial combustion engine. Moreover, the vehicle and its energy sources are designed and controlled to reduce pollution.

In spite of the above, there is room for improvement. That is, even though a hybrid electric vehicle has a much smaller heat engine than a normal vehicle and its speed of operation is optimized, it must be remembered that any vehicle having an on-board heat engine will produce exhaust emissions when the engine runs, which emissions have undesired constituents. In this connection, efforts to reduce harmful exhaust emissions from standard internal combustion engines have resulted in the catalytic converter. Two of the undesired constituents of exhaust are hydrocarbons and carbon monoxide. In the presence of a catalyst, the combustion temperature of these gases is lowered to a temperature which is typically found in an automobile's exhaust. They are therefore converted to less harmful constituents, i.e., water, carbon, and $CO_2$. However, a large (about 80%) percentage of harmful hydrocarbon and carbon monoxide emissions are produced in a standard engine during its first few minutes of operation, i.e., following a cold engine start. Conventional catalytic converters do not affect these cold-start emissions because it takes such a converter several minutes to reach an effective reaction or "light-off" temperature. Because of this cold start problem, there has been introduced to the field electrically heated catalytic converters. Such catalytic converters work by heating the catalyst in the converter before an engine is started. A major difficulty with use of such converters in conventional vehicles is, of course, the delay caused by the time required for catalyst heating before the vehicle even can be operated.

SUMMARY OF THE INVENTION

The invention minimizes the exhaust emissions of a hybrid electric vehicle. It includes besides the typical electrical energy storage device and heat engine found in a hybrid vehicle, a catalytic converter connected to receive the exhaust gas from the engine and a controller which, among other things, causes preheating by electrical energy of a catalyst in a converter for at least one of the undesired constituents in the exhaust gas. In keeping with the invention, the controller is set to cause such heating when the vehicle has driving torque being delivered to its wheels by electrical energy. Thus there is no vehicle operation delay caused by the catalyst preheating.

Most desirably, a sensor is included for determining when the electrical energy in the storage device is at a set low level. The controller is set to react to this low level to cause electrical energy to be directed to the catalytic converter to preheat it.

The invention includes both the method and apparatus. In this connection, it must be remembered that from the broad standpoint the apparatus is different than previous apparatus not only in that the hybrid vehicle enhances the usefulness of preheatable catalytic converters in that the converter can be preheated while driving torque is being provided to the vehicle solely by electrical energy without any contribution, direct or indirect, by the heat engine. Such an arrangement is possible only if the controller is so arranged that it causes the heating by electrical energy during such time.

Other features and advantages of the invention either will become apparent or will be described in connection with the following, more detailed description of preferred embodiments of the invention and variations.

DETAILED DESCRIPTION OF THE PREFERRED EMBODIMENT

The following relatively detailed description is provided to satisfy the patent statutes. It includes potential variations. The inclusion of these is not to be construed as an indication of all possibilities which come within the scope of the invention. Various other additions, changes and modifications can be made without departing from the invention.

Figure 1:
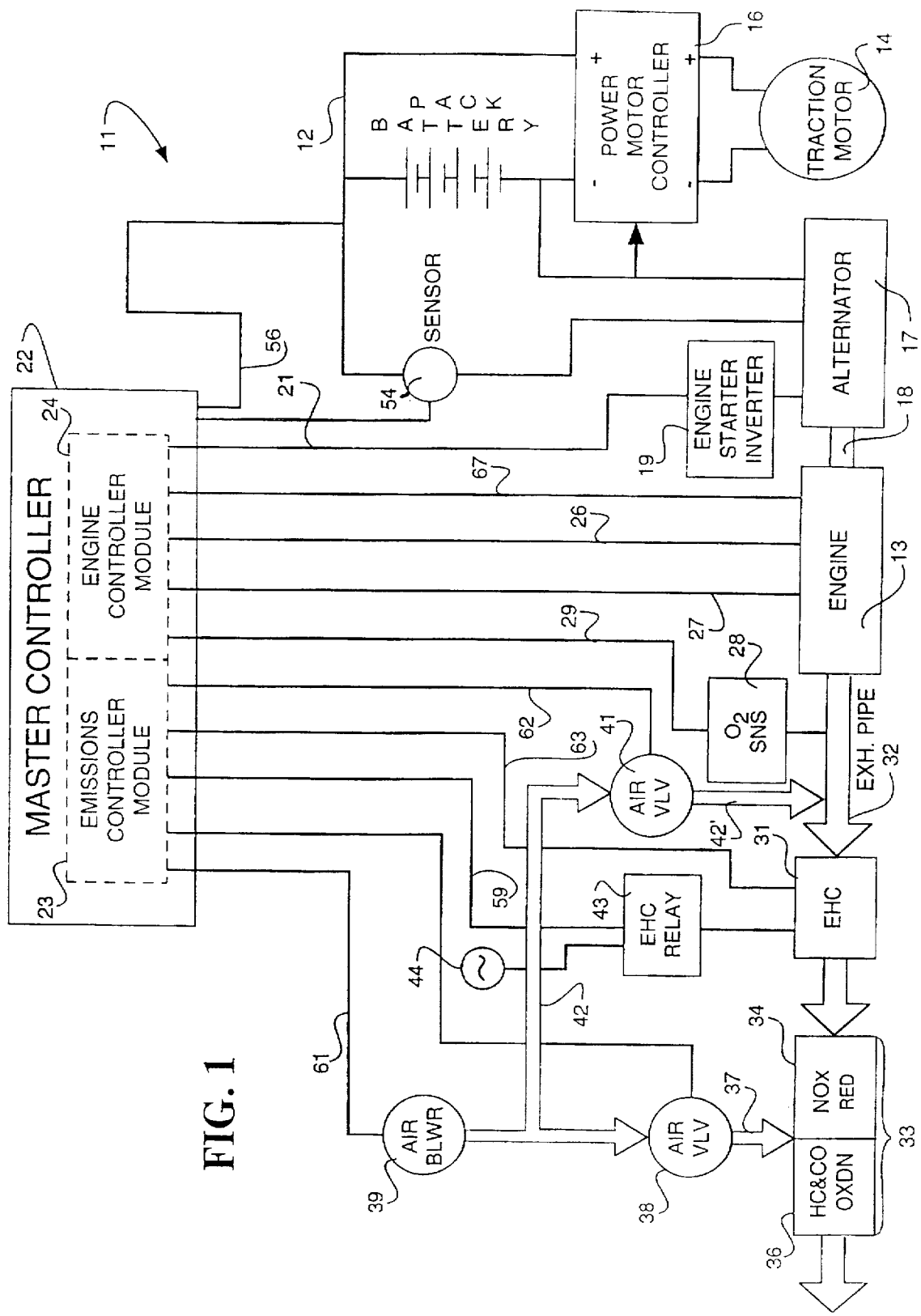
FIG. 1 is a block diagram of the major components of a hybrid electrical vehicle incorporating a preferred embodiment of the invention.

A preferred embodiment of that portion of a hybrid electric vehicle relevant to the invention is generally referred to in FIG. 1 by the reference numeral 11. It is to be noted that while the invention is being described in connection with a series hybrid type of electric vehicle, it is equally applicable to a parallel hybrid type in which the heat engine provides driving torque.

Vehicle 11 has both a set of electrical storage devices in the form of a battery pack 12, and a heat engine 13. The heat engine 13 preferably is a rotary engine of the type well-known in the art; however, it will be appreciated by those skilled in the art that four- or two-stroke engines, gas turbines and the like also may be used. Preferably engine 13 will be a fuel injected one that is tuned to operate at its maximum efficiency.

Driving torque is delivered to the vehicle wheels by a traction motor 14. In a preferred implementation, motor 14 is a multi-pole, direct current, permanent magnet motor; however, it will be appreciated that other types of motors, for example, multiphase alternating current motors, may be used. It is preferable that the motor 14 have a low mass rotor for high speed response and quiet operation and to provide minimum clogging and high torque.

Although not shown, the driving torque produced by motor 14 is transferred to the drive wheels of the vehicle through a transmission via a differential. Commonly, the rotating element of the transmission's torque converter will be coupled to the output shaft of the motor with a shaft adapter.

As is illustrated, in this embodiment of the invention, all of the driving torque is provided by electrical energy and, in this connection, a motor controller 16 is included as is conventional to control operation of motor 14. The windings of motor 14 preferably are such that series-parallel combinations can be switched, and the commutation of the motor is controlled by controller 16 in a well-known manner.

Consistent with the series-type hybrid vehicle illustrated, the output shaft 13 of the heat engine is not directly connected either to the traction motor 14. Rather, it is connected to an electrical generator in the form of an alternator 17. (As mentioned previously, the term "generator" in its various tenses and forms is used herein in a generic sense and is meant to include an alternator.) In an implementation of the invention, an alternator was selected having a three-phase permanent magnet brushless module providing high power to weight ratio, and high efficiency. Alternator 17 also is capable in the preferred embodiment being described of acting as a starting motor for engine 13, i.e., it can either transform mechanical energy from the engine into electrical energy for the battery pack or transform electrical energy into mechanical energy. A box 19 labeled "ENGINE STARTER INVERTER" is included in the drawings to illustrate this point, which box has a control line 21 extending between it and a master controller represented at 22.

It is the master controller which provides the logic for operating the vehicle as desired. Such controller includes significant software, firmware and/or hardware logic. Only those portions of the logic applicable to the invention being described are indicated. To facilitate description, much of such logic is shown divided into a pair of modules, an emissions controller module 23 and an engine controller module 24. The "START CONTROL" control line 21 relates to initiating operation of the heat engine and, in this connection, is actually shown extending to the inverter 19 from the engine controller module 24 of the master controller.

The heat engine is selected to operate at a speed and load sufficient to provide on the output terminals of the alternator 17, an output voltage that is necessary to both recharge the electric storage device 12 while such device is at the same time providing the driving energy that is required. To reduce emissions it is desirable to maintain operation of the engine at its optimum, constant speed. Although the engine preferably will be operated at a constant rate which not only will provide the power needed to operate the traction motor 14 but also to provide a predetermined average recharge rate for the battery pack 12, there will be times in which the traction motor will draw a lot of current. This will happen, for example, when the vehicle is traveling up an extended grade. In this situation, the battery pack supplements what is needed beyond that which the engine/alternator supplies.

A heat engine "shutdown control" line 26 is also illustrated, as well as an air/fuel mixture control line 27. (The air/fuel mixture of the engine will, of course, have a major effect on the exhaust emissions.) In this connection, an oxygen sensor for the engine exhaust is indicated at 28, which oxygen sensor provides input to the engine controller module as indicated by signal line 29. It will be appreciated that this input is utilized in determining an appropriate air/fuel mixture—however, many factors besides the exhaust constituents will affect the air/fuel mixture in a common controller arrangement. As an example, the power output that is required will affect such mixture as well as, of course, such things as elevation, etc.

Exhaust from the engine 13 is passed through a pair of catalytic converters before it is expelled to the atmosphere. The exhaust is first directed, in keeping with the invention, to an electrically heated catalytic converter (commonly referred to as an "EHC") represented by block 31. The direction of the exhaust to the EHC 31 is represented by pipe 32. From the EHC, the exhaust is directed to another catalytic converter represented at 33. Such converter is a standard three-way catalytic converter and includes a pair of sections 34 and 36 separated in essence by a location at which air with its high oxygen content is introduced into converter 33. This introduction is represented in the figure by pipe arrow 37. After such introduction, the converter 33 is quite effective in oxidizing the hydrocarbons and carbon monoxide constituents of the exhaust gas, whereas before such introduction the converter 33 primarily removes the $NO_x$ constituents. An air valve represented at 38 controls the flow of air into converter 36, which air valve is supplied by an air blower 39. As is illustrated, air provided by blower 39 also may be introduced into the exhaust before either of the pair of catalytic converters.

This is represented in FIG. 1 by the inclusion of air valve 41 and air flow arrows 42 and 42'.

The supply of electrical energy to the electrically heated converter 31 for conversion to thermal energy is controlled by a relay represented by block 43. The electrical energy supply, in the implementation being described, is provided by the accessory electrical energy battery and is represented by 44.

Figure 2:
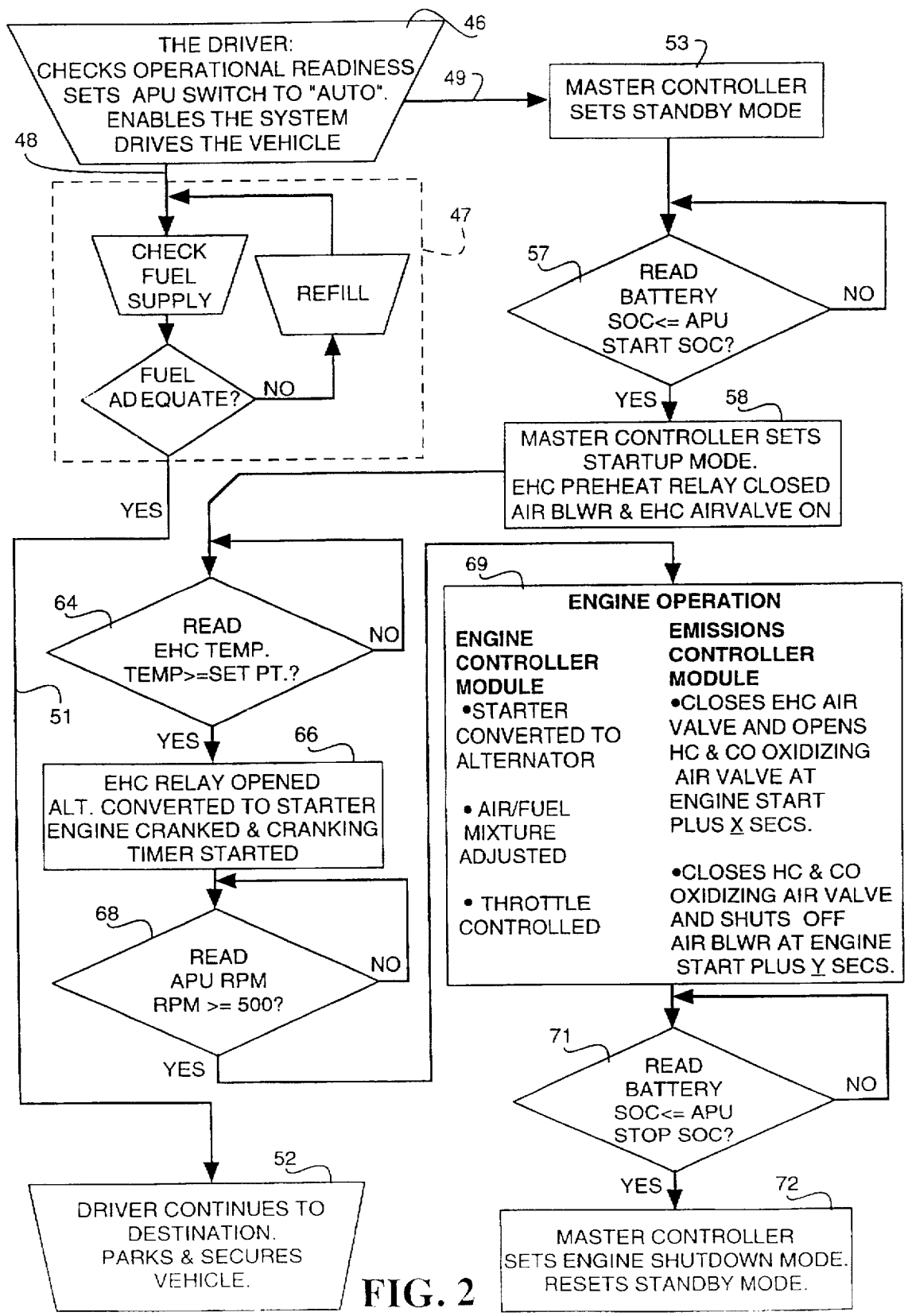
FIG. 2 is a flow chart of a hybrid control arrangement for such vehicle.

The inventive aspects of the system is best understood by a description of its operation. FIG. 2 is a logic flow chart of an implementation of the preferred embodiment. The first thing to note is that the operation is entirely automatic. The driver when he enters a hybrid vehicle of the invention first simply checks the operational readiness as is done with a conventional I.C. vehicle. In this connection, the operating controls for the vehicle can be a standard brake pedal and accelerator. The driver then sets the APU switch (the heat engine switch) to "auto", enables the system (this can be as simple as turning a key) and drives to his destination.

The above simple "operation" by the driver is represented in FIG. 2 by block 46. Once the vehicle is in operation the only thing the driver must do before he reaches his destination is to do the common driver operations, such as to check the fuel supply and refill it as necessary. This operation is indicated in FIG. 2 by the logic loop indicated at 47. While the number of times this must be repeated will depend, of course, on the size of the fuel tank and the rate at which fuel is used, the inclusion of this operation in the flow chart is not meant to indicate that it is contemplated in using the invention that it will be necessary to fill the fuel tank more often than a driver may typically be used to. In fact, in an implementation of the invention it is expected the vehicle will normally go about 400 miles before it becomes necessary to refill the fuel.

The automatic nature of the invention is exemplified by the logic flow diagram. There are two outputs represented at 48 and 49 from block 46. A driver typically only has to be conscious of what happens during the drive, i.e., what happens in the 48 output branch of the logic diagram. As is indicated, besides checking the fuel and reacting to other typical inputs during the drive, the driver will simply continue to his/her destination and park and secure the vehicle. This is indicated by the flow line 51 extending to the block 52 at the end of the diagram. It should be noted that if the destination is one providing a battery charger, the driver may wish to plug in the vehicle so that the batteries will be charged. For example, if the destination is a home destination and the vehicle is to be left overnight, the driver may plug in the vehicle to take advantage of the nighttime lack of vehicle operation and the well-known nighttime power use dip in electrical energy use for other purposes.

The operations associated with output 49 are initiated at the beginning of the driving operation by the driver setting the APU switch to "auto". This places the master controller 22 in a standby mode. Block 53 in FIG. 2 represents this automatic operation. The master controller then continually calculates the battery state of charge (SOC). In this connection a sensor 54 (FIG. 1) is connected between the battery terminals. Signals indicating the battery bus voltage and current are fed to the master controller as is represented in FIG. 1 by line 56. The reading of the battery bus voltage and current is indicated in FIG. 2 by diamond 57. When the battery state of charge falls below a set value, the master controller enters the APU startup mode as is represented by block 58. The battery state of charge value at which the master controller will initiate the startup mode will depend on many factors which will be taken into consideration by the individual or entity setting up the master controller—in one implementation the master controller was set to provide such conversion when the battery state of charge dropped to 50% of the rated capacity of the battery pack selected.

When the master controller is set to the "startup" mode, before it actually starts the heat engine it takes the steps necessary to assure that the converter 31 is pre-heated by electrical energy to the "light-off" temperature. To this end it closes relay 43, initiates operation of air blower 39 and opens air valve 41. (Air flow ensures that heating in the EHC is uniform.) In this connection, FIG. 1 illustrates control lines 59, 61 and 62 extending between the emissions controller module 23 and the respective components.

In this embodiment, the temperature of the electrically-heated catalytic converter 31 is monitored as is represented by signal line 63. When the temperature reaches the desired set point (typically slightly higher than the "light-off" temperature), relay 43 is opened to discontinue the electrical heating. If the temperature falls to a lower threshold level, relay 43 is again closed and electrical heating will resume until the desired set point is again attained. It will be recognized that although in this description it is the temperature which is measured, it is well within the contemplation of the invention for there to be a set time for preheat rather than a direct measure of the temperature. Of course an engine block heater or the like could also be provided to preheat the engine 13 as well as the catalytic converter 31.

The monitoring operation is represented in FIG. 2 by decision diamond 64 and its accompanying loop. At the same time the relay 43 is opened, i.e., the electrical heating is discontinued, the steps to initiate operation of the engine 13 are accomplished. Alternator 17 is controlled to become a starting motor and the engine cranking timer starts. This operation is represented in FIG. 2 by block 66. The starting operation is monitored (the starting operation may be stopped after a certain period of cranking) and if and when the RPM of the engine reaches a certain speed, the master controller initiates engine operation setup and control. This measurement and the feedback of the same to the engine controller module is represented in FIG. 1 by RPM signal line 67. The decision by the master controller is represented in FIG. 2 by diamond 68 and its accompanying loop. When the hybrid vehicle enters the heat engine operation mode, the master controller does many things. Insofar as this invention is concerned, it is important to note that the engine control module now controls the starter motor as an alternator. Moreover, such module adjusts the air/fuel mixture and throttle as is necessary, taking into consideration the make-up and volume of the exhaust emissions as discussed previously. This control during engine operation is represented in FIG. 2 by block 69.

The emissions control module closes the air valve 41 providing air flow through the converter 31 and opens the air valve 38 providing air flow into the converter 33. It does this in a set time after the engine begins operating—in one implementation of the invention the controller was set to do so 75 seconds after engine operation. The emissions control module of the master controller then closes the valve 38 after it has been open for a particular period of time and at that time also shuts off air blower 39. In the implementation of the invention mentioned above, the controller was set to do this at 130 seconds after engine operation started.

As mentioned previously, the battery bus voltage and current are continuously read and battery state of charge (SOC) determined. When the engine is operating, however, the SOC value determines when the APU is stopped. That is, when the battery state of charge exceeds a particular level, then the engine operation can be discontinued—in one implementation of the invention the controller was set to discontinue such operation when the battery SOC was equal to or greater than 70%. Diamond 71 and its accompanying loop is included in FIG. 2 to represent this logical step. The shutting down of the engine by the master controller is represented by block 72. The standby mode is also reset. The result is that the operation discussed above will be repeated if and when the voltage across the battery pack state of charge falls below the set engine start SOC.

As mentioned at the beginning of the detailed description, applicant is not limited to the specific embodiment and variations described above. They are exemplary, rather than exhaustive. The claims, their equivalents and their equivalent language define the scope of protection.

What is claimed is:

1. A hybrid electric vehicle comprising in combination:
   A. an electrically powered motor connected to provide the sole driving torque for said vehicle;
   B. an electrical energy storage device connected to said motor to provide electrical energy for driving said vehicle;
   C. a generator for applying electrical energy to the electrical energy storage device.
   D. a sensor for determining when the electrical energy in said storage device is at a predetermined level and providing an output.
   E. a heat engine having one or more undesired constituents in its exhaust gas when said engine is operating to drive said generator;
   F. a catalytic converter including a catalyst heated by electrical energy for at least one of said constituents connected to receive exhaust gas from said engine; and
   G. a controller responsive to said sensor output for applying electrical energy to said converter to cause heating of said catalyst and thereafter operating said heat engine.

2. The hybrid electric vehicle of claim 1 wherein said generator also acts as a starter motor for said engine and converts electrical energy into mechanical energy required by said heat engine to initiate operation of the same.

3. The hybrid electric vehicle of claim 1 wherein there are a pair of said catalytic converters and said controller is adapted to cause heating by electrical energy of a catalyst in one of said pair.

4. The hybrid electric vehicle of claim 1 wherein the exhaust gas is relied upon to maintain a selected catalyst light-off temperature of said catalyst after said engine is energized.

5. The hybrid electric vehicle of claim 1 wherein said generator is connected to the heat engine output shaft so as to convert all of the heat engine mechanical energy to electrical energy for said vehicle.

6. The hybrid electric vehicle of claim 1 further including as part of said combination, means for directing air flow to said converter to enhance conversion by said catalyst of an undesired constituent in said exhaust gas and wherein there are a pair of said catalytic converters and said controller is adapted to cause heating by electrical energy of a catalyst in one of said pair.

7. The hybrid electric vehicle of claim 1 further including as part of said combination, means for directing gas flow to said converter to enhance conversion by said catalyst of an undesired constituent in said exhaust gas.

8. The hybrid electric vehicle of claim 7 wherein said gas is air.

* * * * *